US007694320B1

(12) United States Patent
Yeo et al.

(10) Patent No.: US 7,694,320 B1
(45) Date of Patent: Apr. 6, 2010

(54) SUMMARY FRAMES IN VIDEO (75) Inventors: Boon-Lock Yeo, Cortlandt Manor, NY (US); Minerva Ming-Yee Yeung, Cortland Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 1460 days.

(21) Appl. No.: 09/670,865

(22) Filed: Sep. 27, 2000

Related U.S. Application Data (63) Continuation of application No. 08/956,417, filed on Oct. 23, 1997, now Pat. No. 6,219,837.

(51) Int. Cl.
G06F 3/00 (2006.01)
G06F 13/00 (2006.01)
H04N 5/445 (2006.01)
H04N 7/16 (2006.01)

(52) U.S. Cl. .......................... 725/41; 725/136; 725/40; 725/43; 725/38; 725/44; 715/720; 715/716; 715/719

(58) Field of Classification Search ............. 725/37–38, 725/40–41, 61, 112, 151, 131, 139, 32; 345/719–722; 348/559, 565; 715/721
See application file for complete search history.

(56) References Cited

U.S. PATENT DOCUMENTS 5,606,655 A * 2/1997 Arman et al. ............... 345/440
5,692,213 A * 11/1997 Goldberg et al. ............ 715/203
5,710,601 A * 1/1998 Marshall et al. ............. 725/41
5,815,145 A * 9/1998 Matthews, III ............... 725/41
5,852,474 A 12/1998 Nakagaki et al.
5,884,056 A * 3/1999 Steele ......................... 715/738
5,926,230 A * 7/1999 Niijima et al. ................ 725/56
6,005,562 A * 12/1999 Shiga et al. .................. 715/721

(Continued)

OTHER PUBLICATIONS

Arman et al. "Content-based Browsing of Video Sequences", Proceedings of the second ACM International Conference on Multimedia published in 1994; ISBN: 0-89791-686-7; pp. 97-103.*

(Continued)

Primary Examiner—Christopher Kelley
Assistant Examiner—Usha Raman
(74) Attorney, Agent, or Firm—Brian Verminski; Greenblum & Bernstein P.L.C.

(57) ABSTRACT

According to the invention, channel surfers are aided by summary frames appearing on the screen along with the regular program. These summary frames are embedded in the broadcast and appear in a small window on the screen at some point in the future as the video is broadcast. The summary frames depict key scenes from the past which aid the viewer in quickly ascertaining the current plot or theme of the video program. In an interactive television environment, a short video segment may be associated with each shot such that when the shot is selected, the past video segment is played in a larger window on the screen complete with sound. Once the segment is viewed, the video program is rejoined in progress with the viewer having a better sense of what is going on in the video. Hence, a when a channel surfer arrives at a new channel, rather than only having what is currently playing to catch the eye, summary frames are also available to catch the surfer's attention and aid in understanding the programming.

16 Claims, 12 Drawing Sheets

U.S. PATENT DOCUMENTS

| | | | |
|---|---|---|---|
| 6,144,376 A * | 11/2000 | Connelly | 725/44 |
| 6,147,714 A * | 11/2000 | Terasawa et al. | 348/564 |
| 6,163,345 A * | 12/2000 | Noguchi et al. | 348/564 |
| 6,263,507 B1 * | 7/2001 | Ahmad et al. | 725/134 |
| 6,412,111 B1 * | 6/2002 | Cato | 725/137 |
| 6,732,369 B1 * | 5/2004 | Schein et al. | 725/39 |
| 2006/0037044 A1 * | 2/2006 | Daniels | 725/39 |

OTHER PUBLICATIONS

Yeo et al. "Rapid Scene Analysis on Compressed Video", IEEE Transactions on Circuits and Systems for Video Technology published in Dec. 1995; vol. 5, No. 6; pp. 533-544.

* cited by examiner

SUMMARY FRAMES IN VIDEO

CROSS REFERENCE TO RELATED APPLICATIONS

This is a continuation of U.S. patent application Ser. No. 08/956,417, now U.S. Pat. No. 6,219,837, filed on Oct. 23, 1997, the contents of which are herein incorporated by reference.

BACKGROUND OF THE INVENTION

1. Field of the Invention

The present invention generally relates to placing summary frames in a video and, more particularly, to a system for placing summary frames into a currently playing video depicting either past or future scenes so that a viewer can get a quick overview of the video.

2. Description of the Related Art

Television viewers are stymied at the number of viewing choices available these days. Cable television systems typically offer one-hundred or more channels to viewer subscribers. Digital satellite systems make available hundreds of channels for viewing choices. Video signaling over, for example, the Internet, allows interactive viewing and the downloading of video from virtually millions of sites. For better or worse, all of these video and entertainment choices have made couch potatoes, more kindly referred to as "channel surfers", out of many of us.

In a typical channel surfing scenario, a surfer, armed with an infrared remote control, sits or lies across the room, carefully aims, and begins repeatedly pressing the "channel-up" or "channel-down" button in the general direction of the television set. A good surfer is oblivious to other viewers in the room and the other viewers are usually powerless to stop an experienced surfer. A surfer will typically not spend more than two or three seconds on any one channel unless there is something on the screen at that precise moment which is of interest. Channels with commercials currently airing and most movies deemed to be well in progress are surfed over almost instantly with very little pause. Similarly, the two or three seconds that a good surfer typically gives a channel before surfing to the next may be insufficient time to accurately determine the true merit of the programming on the channel.

Based on the above scenario, there is a real need in the art for a system to more accurately inform channel surfers or other video viewers of the contents of the current programming on a particular channel and to offer a quick overview of the video program to get the viewer quickly "up to speed" on programs already in progress.

SUMMARY OF THE INVENTION

It is therefore an object of the present invention to provide summary frame windows on the screen of a playing video.

It is yet another object of the present invention to allow a viewer to select one of the summary frames to have a short video clip played on the screen, including the accompanying audio, to get the viewer quickly "up to speed" on programs already in progress.

It is yet another object of the present invention to allow a viewer to quickly jump back to a past segment of a video program to aid in understanding what is presently happening.

According to the invention, various shots or summary frames are selected from a video prior to broadcast. These summary frames are embedded in the broadcast and appear in a small window on the screen at some point in the future as the video is broadcast. The summary frames depict key scenes from the past which aid the viewer in quickly ascertaining the current plot or theme of the video program. In an interactive television environment, a short video segment may be associated with each shot such that when the shot is selected, the past video segment is played in a larger window on the screen complete with sound. Once the segment is viewed, the video program is rejoined in progress with the viewer having a better sense of what is going on in the video. Hence, when a channel surfer arrives at a new channel, rather than only having what is currently playing to catch the eye, summary frames are also available to catch the surfer's attention and aid in understanding the programming.

In a television broadcast environment, this invention is particularly helpful in the event a preempting commercial is airing when a particular channel is surfed. Since the summary frames remain on the screen, the viewer now has a way to quickly determine what program is playing and if it is worth viewing. Similarly, in the event a program is preempted, for example, for an emergency broadcast or an overtime sports event, summary frames are provided to keep the viewer in touch with the regularly scheduled programming. Similar to a television broadcast, the summary frames may also be embedded in prerecorded media, such as, for example, video tape or video disks.

In an interactive video environment (i.e., video signaling, for example, over the Internet), the summary frames may allow for quick hyperlinking to a past even future portion of the video. Frames hyperlinking to future portions are referred to as preview frames. When a hyperlink summary or preview frame is selected, the video can jump and actually begin playing in its entirety from that point.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

As used herein, a "video signal" represents both analog and digital video signals. In the case of analog signal, the video signal can be displayed by the existing means of displaying analog signal (e.g., television (TV)). Processing an analog signal is accomplished by first digitizing an analog video signal to a digital video signal, and subsequently processed.

Figure 1:
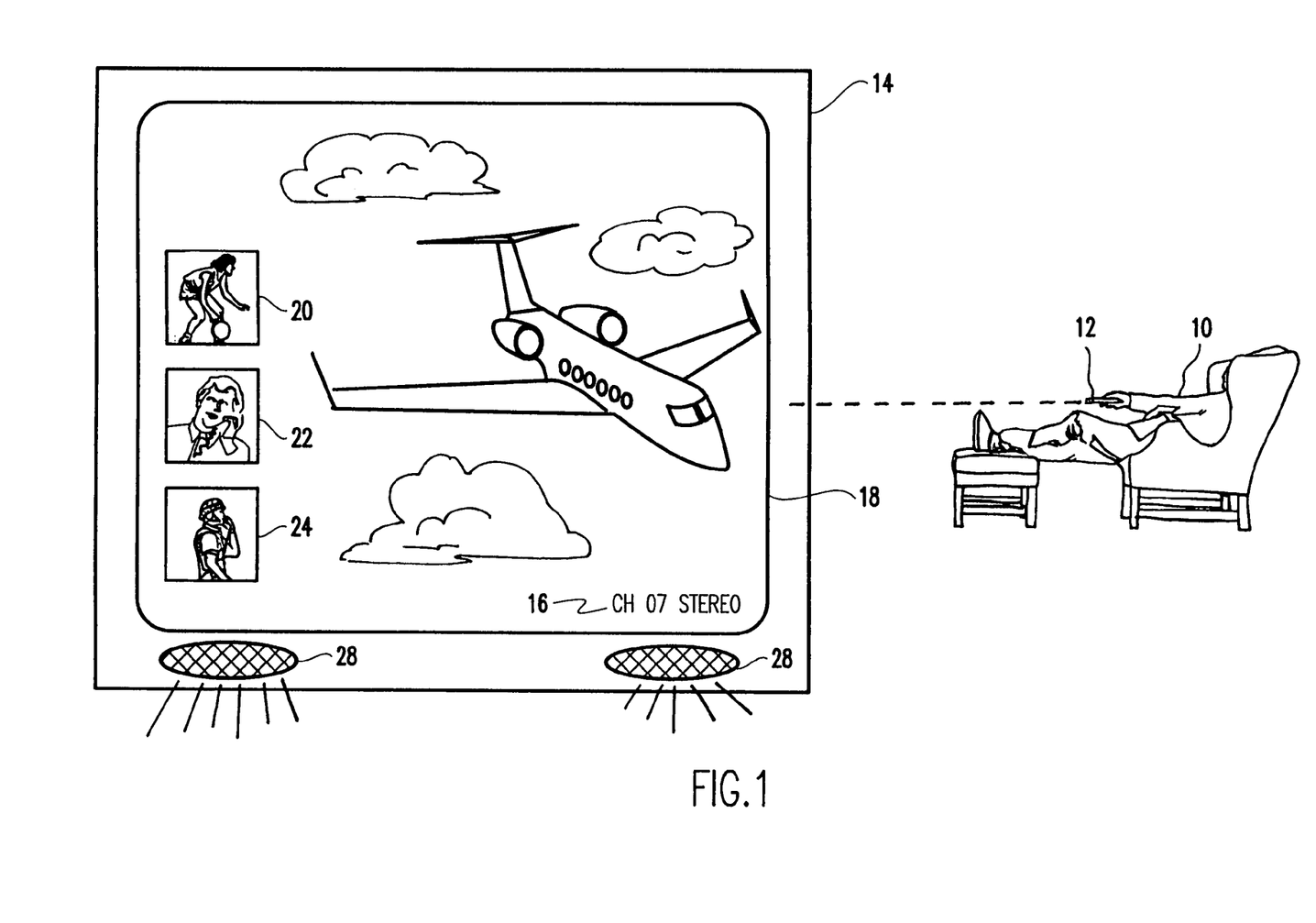
FIG. 1 is a television channel surfing scenario according to a first embodiment of the present invention.

The invention has application in many areas, such as, for example, digital television broadcast, channel-surfing, video-on-demand, digital video disk systems, interactive video playback, Internet video signaling, video databases, and digital libraries. Referring now to the drawings, and more particularly to FIG. 1, there is shown a viewer 10 channel surfing the television channels according to a first embodiment of the invention. The viewer 10 is shown sitting across the room aiming a remote control unit 12 at the television set 14. As the channels are changed, a channel identification and audio stereo indicator 16 may be displayed on the screen 18 for a few seconds. In this example, channel 07 is currently broadcasting what appears to be a small passenger jet flying through the clouds. This video scene may not appear at first glance to be of interest to the viewer 10. Hence, the viewer 10 may be inclined to quickly surf to the next channel.

However, according to the invention, various shots or summary frames are selected from the video prior to broadcast. These summary frames are embedded in the broadcast and appear in a small window as shown on the left side of the screen 18. In this example, three summary frames are shown 20, 22, and 24, respectively. These summary frames depict key scenes from the past which aid the viewer in quickly ascertaining the current plot or theme of the video program. Summary frame 20 shows what appears to be a scene of a girl playing basketball, summary frame 22 shows a man in a suit talking on the phone, and summary frame 24 shows an army soldier talking on a portable phone. Based on this additional information, the viewer 10 has more information on which base his decision to surf to the next channel or to linger on this channel. A short video segment may be associated with each shot such that when the shot is selected, for example by aiming and pointing the remote control or entering a key command on the remote control 12, the past video segment is played in a larger window on the screen complete with audio 28. Once the segment is viewed, the video program is rejoined in progress with the viewer having a better sense of what is going on in the video. Of course, the viewer 10 may select to delete the summary frames from the screen if they wish. Alternatively, the summary screens may automatically disappear from the screen if the channel has not been changed for some time.

Hence, according to the invention, when a viewer 10 arrives at a new channel, rather than only having what is currently playing to catch the eye, the summary frames, 20, 22, and 24, are also available to catch the viewer's attention and aid in understanding the programming. This is particularly useful in the event a commercial is airing when a particular channel is surfed. Since the summary frames appearing on the screen allows the viewer to determine what program is playing and if it is worth waiting for the commercial to end.

Figure 2:
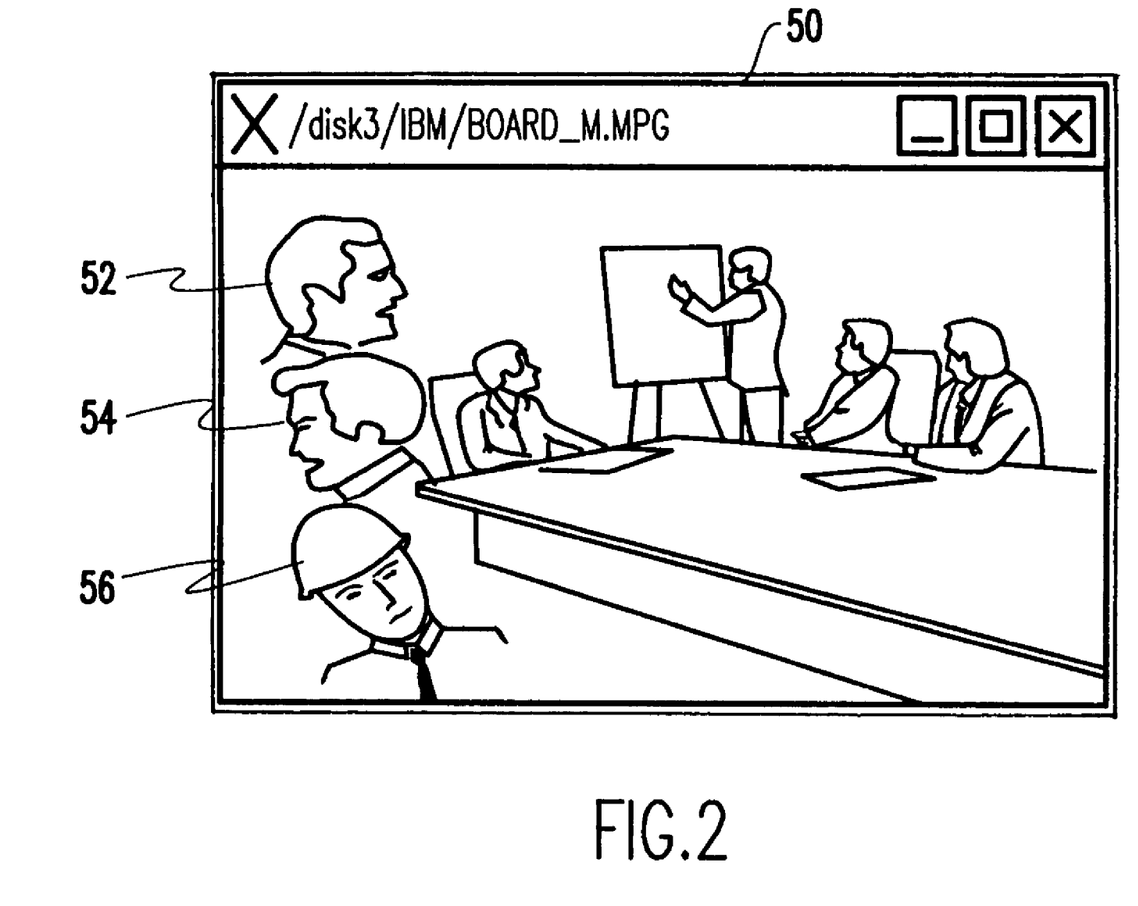
FIG. 2 is a is a computer screen for viewing an interactive video signal.
Figure 3:
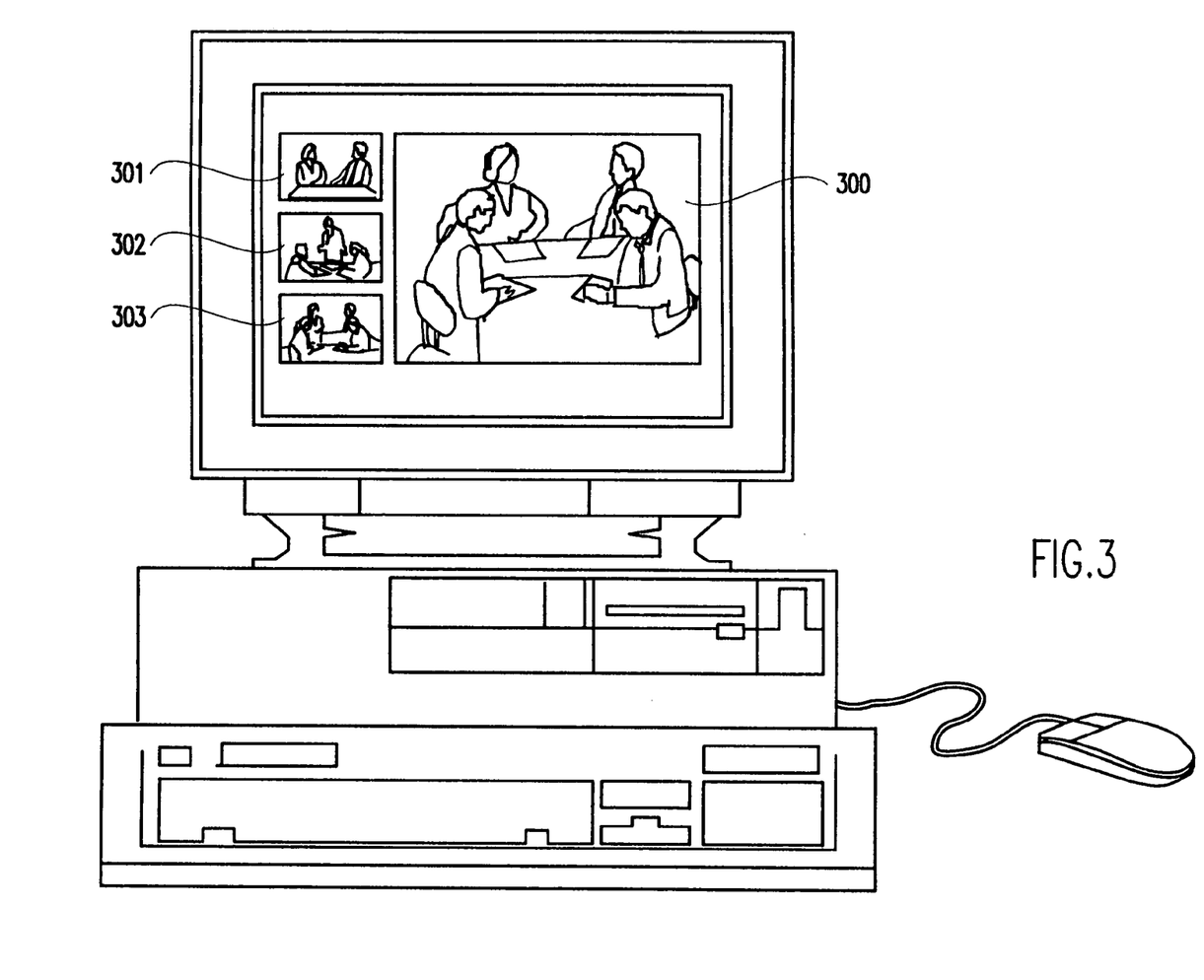
FIG. 3 is a computer display showing a main video playback window and three summary windows.

Referring now to FIG. 2, there is shown a computer screen displaying a video window 50. In an interactive video environment (i.e., video signaling, for example, over the Internet), the summary frames may allow for quick hyperlinking to a past, and preview frames to a future, portion of the video. In this case, when a hyperlink is selected, the video can jump and actually begin playing in its entirety from that point. For example, as shown in FIG. 3, a boardroom meeting video is being viewed. On the lefthand side of the screen, summary screens for three of the speakers at the meeting are displayed, 52, 54, and 56. Clicking on any of these summary frames will hyperlink to that portion in the video and play will begin from that point.

Referring now to FIG. 3, an alternative method of displaying a video window 300 together with the summary frames 301, 302 and 303 on a computer screen is shown. Here, the summary frames 301-303 are displayed on separate windows from the main video window 300. As before, interactivity in the form of hyperlinking and playback of selected summary frames can be facilitated.

Figure 4:
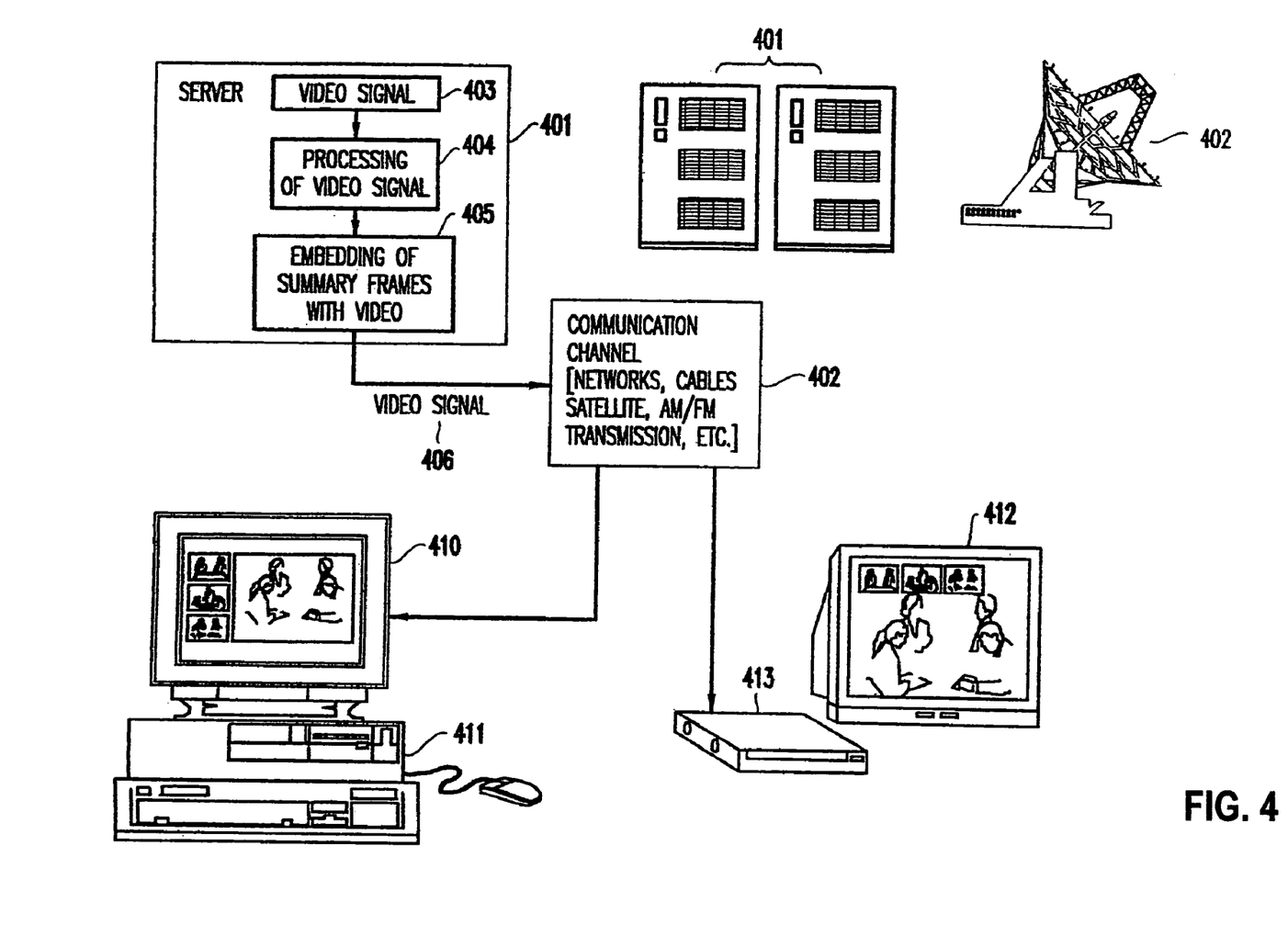
FIG. 4 is a block diagram for video processing at a server for summary display.

Referring now to FIG. 4, a system of processing video signals for summary display is shown. This is a system when the processing of video and embedding of summary is done on a server before the video with summary is sent to the clients. We use the clients to refer to the devices such as computer or set-top boxes/television which the users employ to receive and/or process the incoming video signal.

At the server 401, video signals 403 are first processed at step 404. At this step, summary frames are extracted. At step 405, the summary frames are embedded with the video signal 403 to a combined video signal 406. Video signal 406 is then either stored back into the server 401 and transmitted through communication channels 402. The channels comprise of satellite networks, cables, and other wired or wireless means of communications.

If the video signal 406 is to be transmitted as a digital signal (such as in Direct TV broadcast or over the Internet), then the summary frames can also be embedded as a digital signal into the video signal 406. If the video signal 406 is to be transmitted as an analog signal (such as in NTBC or PAL broadcast), then the summary frames can be embedded/transmitted using one of several techniques: (i) during the blanking intervals of analog TV signals (ii) allocation of additional frequency spectrum (iii) using a different TV channel (iv) or using separate and different channel for transmission, e.g., through telephone lines. The video signal containing summary frames (406) can be played back on a computer screen 410 of a computer 411. Alternatively, in a broadcast environment, it is received in a set-top box 413, decoded and then displayed on a television screen 412. On the television screen 412, the summary frames are overlaid onto the main TV program.

Figure 5:
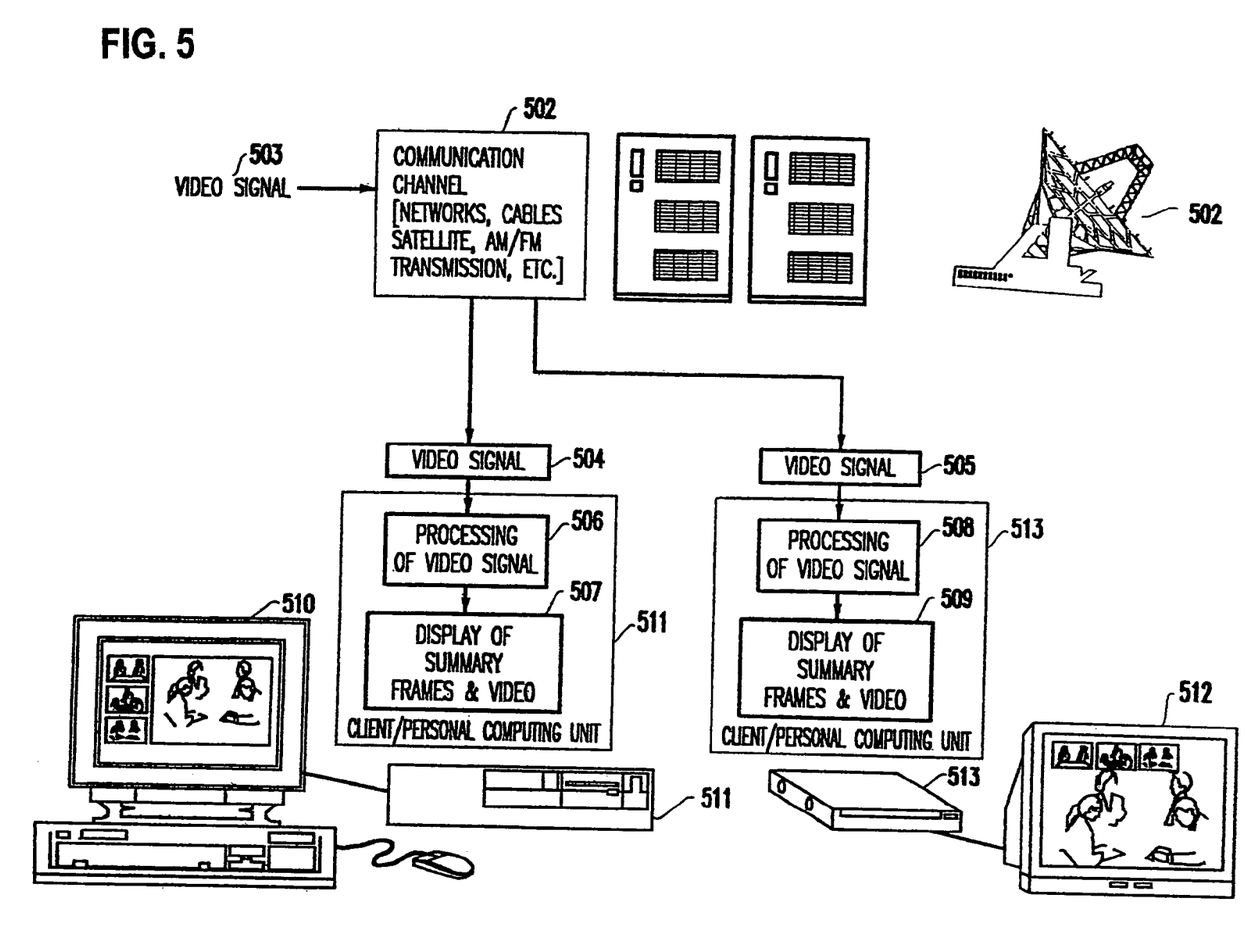
FIG. 5 is a block diagram for video processing at a server for summary extraction and display.

Referring now to FIG. 5, a system of processing video signals for summary extraction and display on the client is shown. A video signal 503 is transmitted through communication channels 502. The signal can either be an analog signal (such as NTCS or PAL) of digital (such as DirectTV). If the client is a computer 511, then processing of incoming video signal 504 is performed first at step 506. The video signal if in analog form, is first digitized to a digital signal. The summary frames extracted are then displayed at step 507 on a computer display 510. If the client is a set-top box 513 and television set 512, then processing first takes place at step 508. Again, if the incoming video signal 505 is analog, it is first digitized. The summary frames are then displayed at step 509 on a television screen 512. If the television display takes as input analog signals, then the summary frames are converted back to an analog signal and then overlaid on top of the regular TV signal for display. The overlay is performed in the set-top box 513.

Figure 6A:
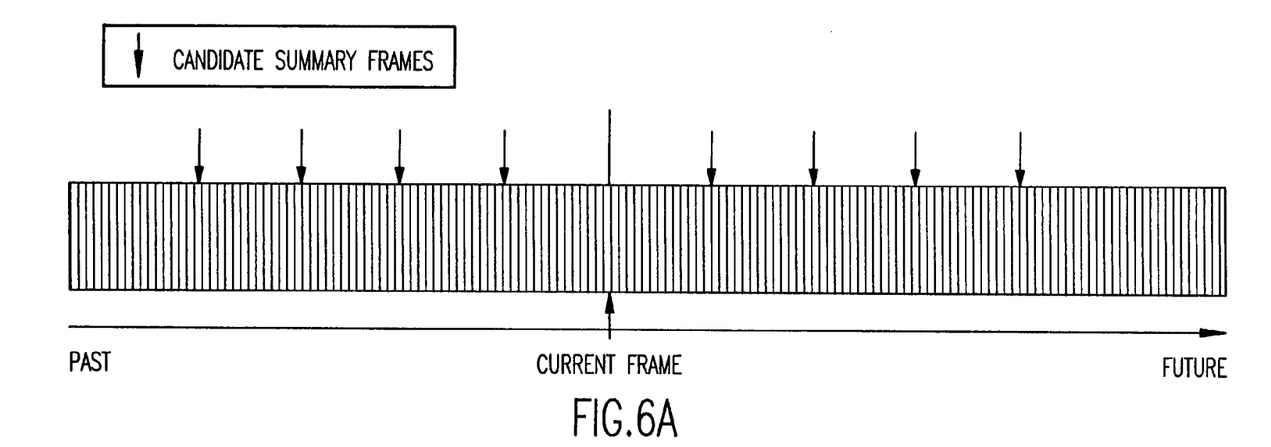
FIGS. 6A and 6B are candidate summary frames with uniform and non-uniform sampling, respectively.

The processes of selecting and displaying summary frames is now described. First, summary frames have to be selected to represent different video content. A straightforward method is shown in FIG. 6A. A candidate summary frame is taken from the video signal at regular time interval t. A fixed memory buffer in a computing device can be maintained to store the selected frames. The candidate summary frames can show the past content or future content, if appropriate. In a live-broadcast, summary frames of past content can be selected.

Figure 6B:
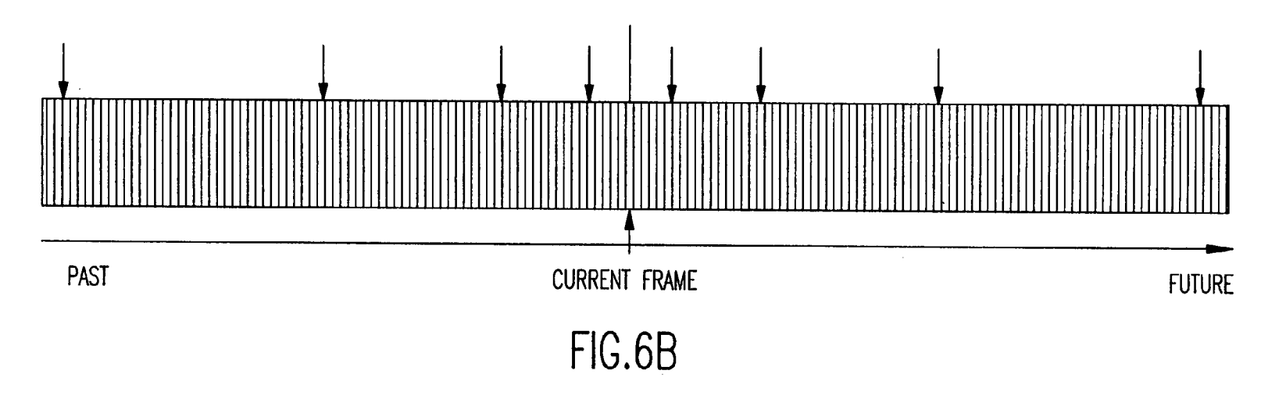

In FIG. 6B, the frames are selected in a non-uniform manner. At a given current frame, it is desired to select more frames that are closer in time to the current frame and fewer frames that are further in time from the current frame (distant past or distant future). However, given a fixed memory buffer in a computing device, it is difficult to maintain such a structure when the current (reference) frame is constantly changing.

Figure 7:
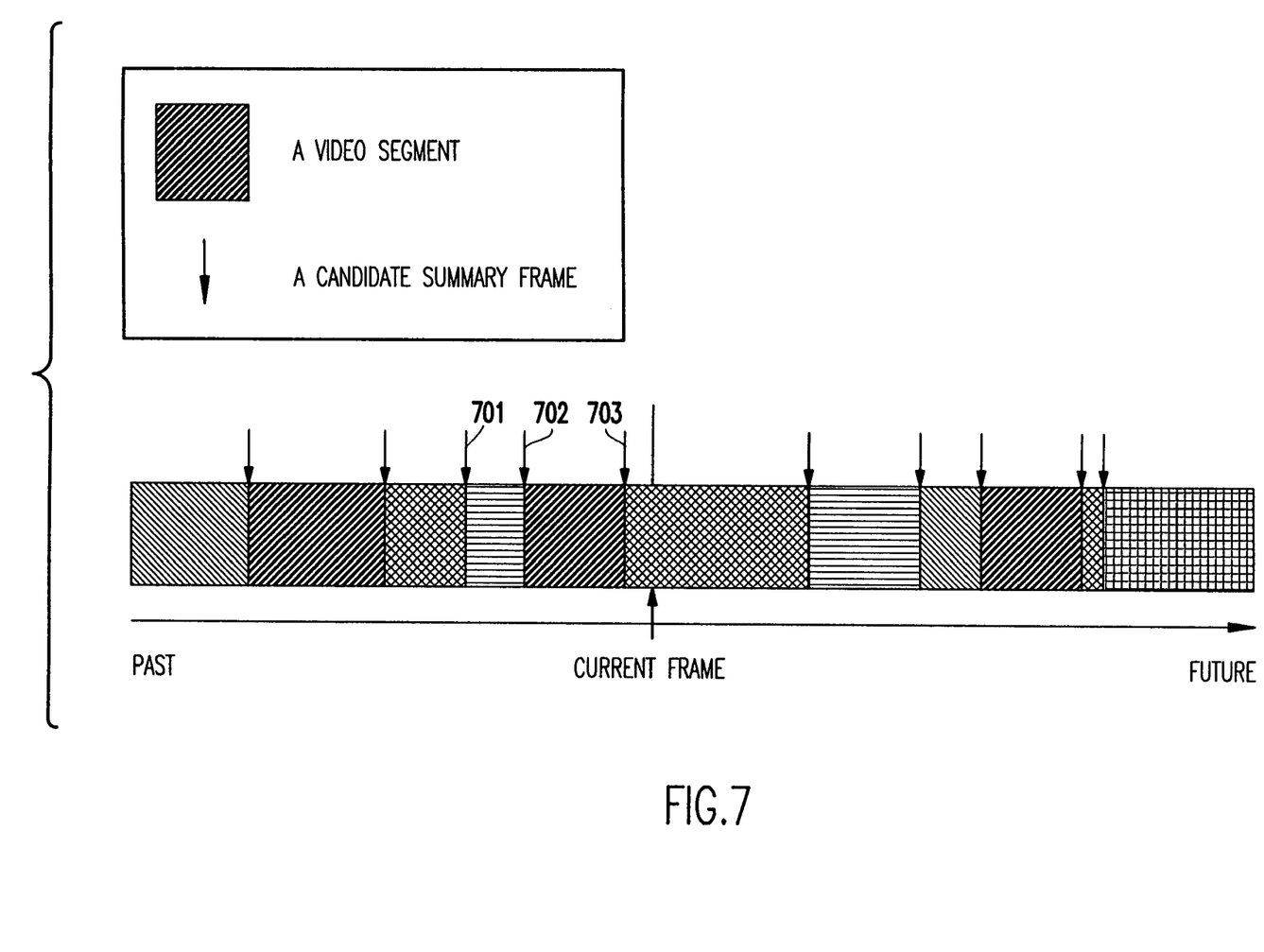
FIG. 7 is a diagram showing candidate summary frames with content based sampling.

An alternative method to select the candidate summary frame is based on content-based sampling of video frames, as shown in FIG. 7. A candidate summary frame is selected only if it is sufficiently different from the previously selected summary frame, that is, it is a good representative of a contiguous segment of video with similar context. For example, 701, 702 and 703 show three candidate summary frames. Summary frame 703 is selected because its content is sufficiently different from 702.

Figure 8A:
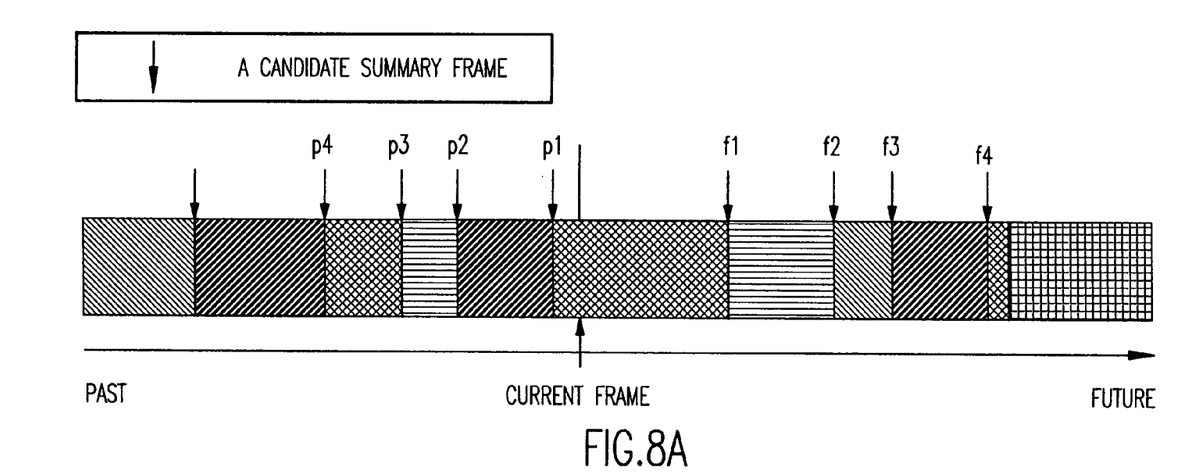
FIGS. 8A-C are examples of candidate summary frames selection and display.
Figure 8B:
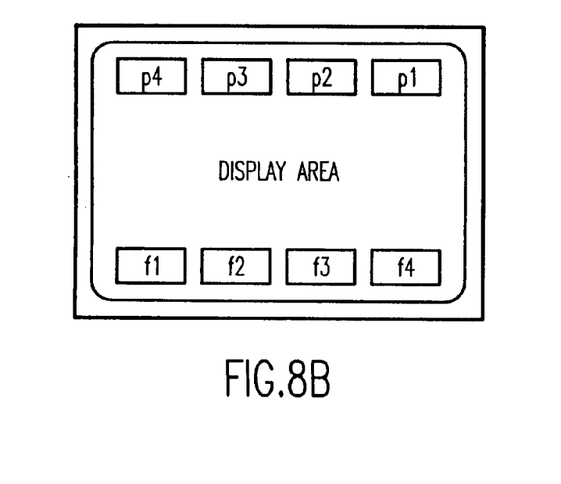
Figure 8C:
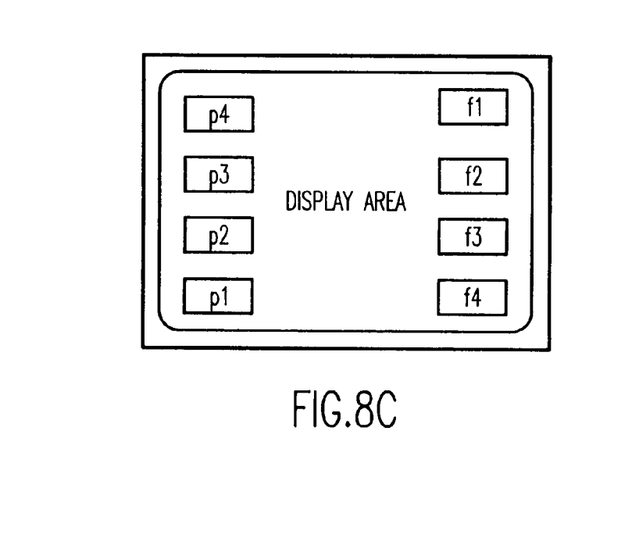

An example method of displaying the summary frames from those selected in FIG. 8A is shown in FIGS. 8B and 8C. From the current frame, four frames p1, p2, p3, and p4 are selected as summary frames representing the past, and four frames f1, f2, f3, and f4 are selected as summary frames representing the future. In FIG. 8B, one method of display the summary frames is shown. Here, the summary frames are overlaid on the top and bottom of the regular display area. The display can be a television display or a computer display. In FIG. 8C, another method is shown wherein the summary frames are overlaid in the left and right of the display. The number of summary frames and the overlaid patterns can be varied.

In the method of FIGS. 6 and 7, there tends to be a lot of repetition in scene structure. The implication is that summary frames selected can be similar in content. Because the display area is limited and the number of summary frames that can be displayed at a time is limited. One method to maximize the use of these resources is to maximize the information that the summary content carries. Thus, the summary frames will better serve this purpose if they show visually differing content, that is, the number of visually similar summary frames in display should be minimized.

Figure 9A:
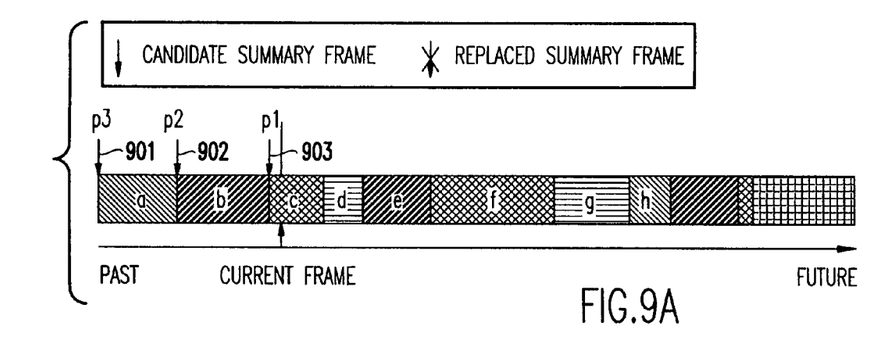
FIGS. 9A-B is a first example candidate summary frame selection/replacement and display, respectively.
Figure 9B:
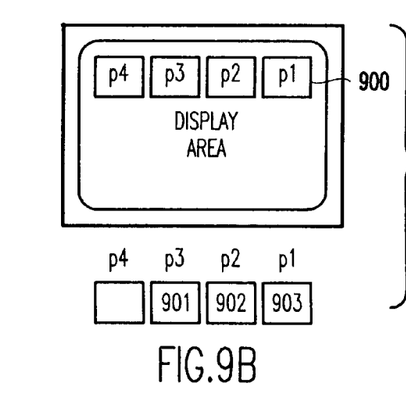
Figure 10A:
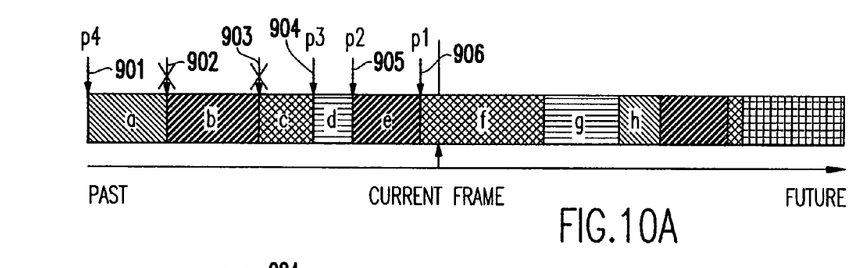
FIGS. 10A-B is a second example candidate summary frame selection/replacement and display, respectively.
Figure 10B:
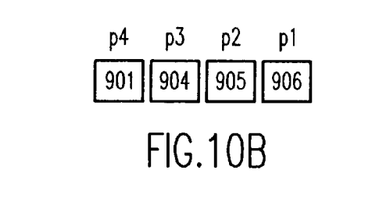
Figure 11A:
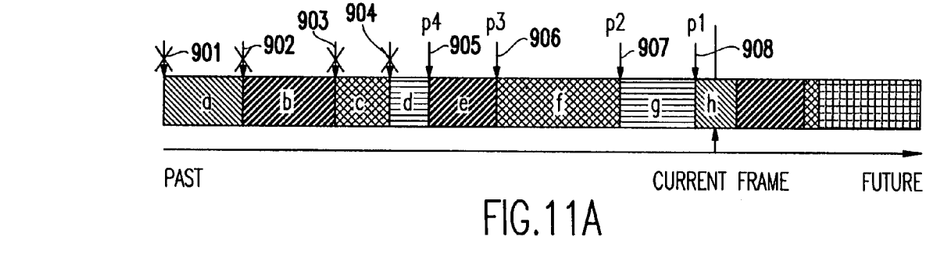
FIGS. 11A-B is a third example candidate summary frame selection/replacement and display, respectively.
Figure 11B:
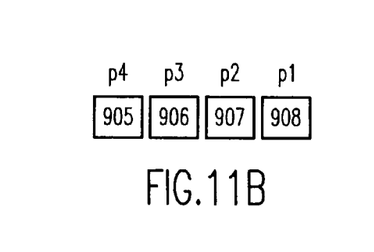

FIGS. 9 to 11 show examples of candidate summary frame selection, replacement and display method that achieve this effect. In FIG. 9A, frames 901, 902 and 903 are the present set of candidate summary frames, designated as p1, p2, and p3 respectively. In FIG. 9B, summary frames are displayed in display 900 as shown.

In FIG. 10A, as new frames are observed, a new set of candidate summary frames are selected. Here, frames 902 and 903 are replaced because they represent similar content to what frames 905 and 906 respectively represent, i.e., segment b is similar to segment e, and segment c is similar to segment f. The selected frames at this instant are 901, 904, 905 and 906. The summary frames are again designated as p1, p2, p3, and p4, and displayed in FIG. 10B. In FIG. 11A, the current frame is now at another position. Here, frames 904 and 901 are also replaced because newer frames 907 and 908 that are similar are observed. In this case, segment a is similar to segment h, and segment d is similar to segment g. The current set of summary frames is displayed as shown in FIG. 11B.

Figure 12:
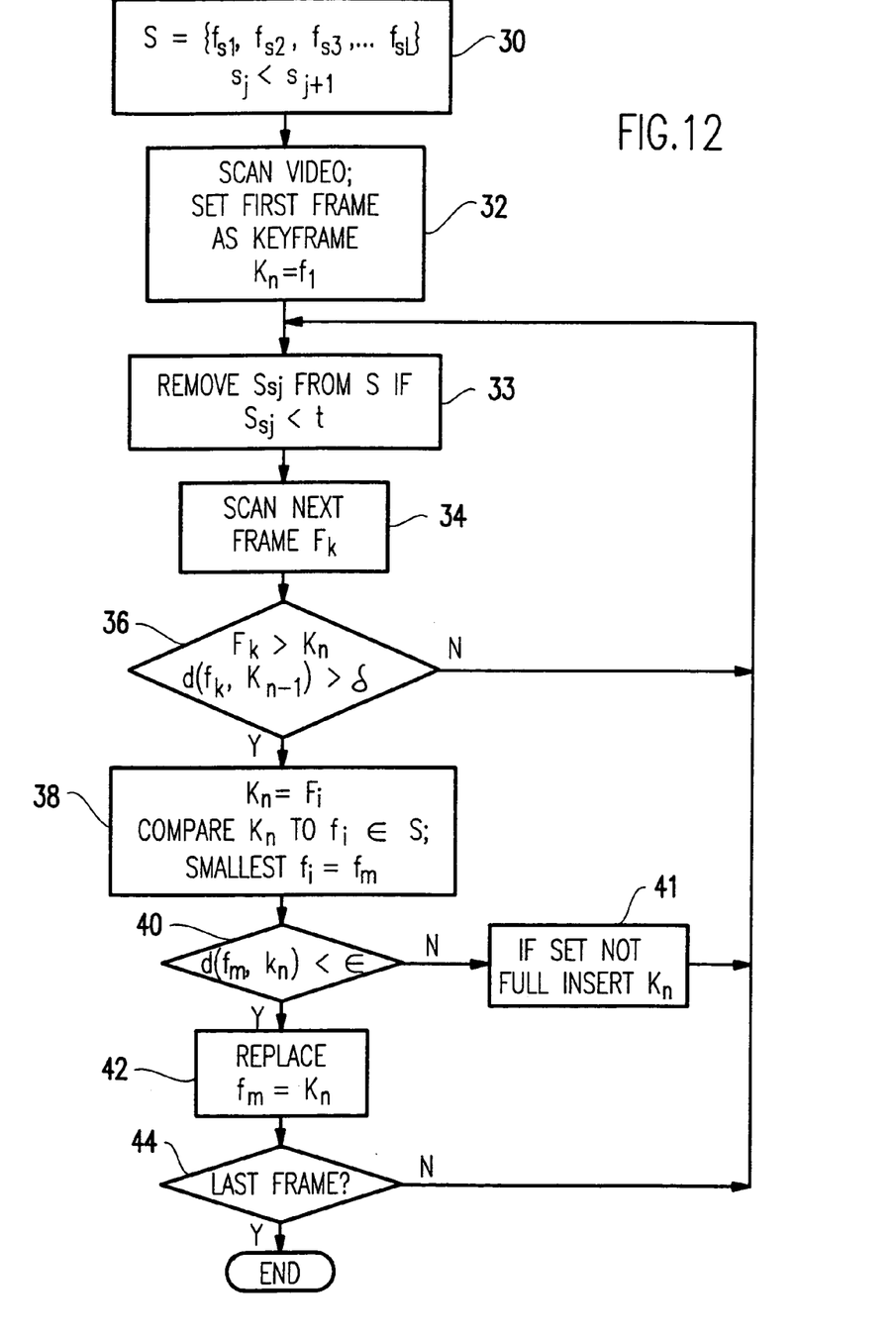
FIG. 12 is a flow diagram for selecting the summary frames.

FIG. 12 is a flow diagram showing a preferred embodiment for selecting the summary frames (process 404, 506, and 508). As shown in block 30, the set of summary frames is denoted as $S=\{f_{s1}, f_{s2}, f_{s3}, \ldots f_{sL}\}$ where the relationship $s_j<s_{j+1}$ holds. Initially, there are no frames in S, i.e., S={ }. At block 32, a video is scanned from the first frame for identification of keyframes $k_n$, that is, initially, the first frame of the video, $f_1$, is selected as the keyframe. At block 33, $S_{sj}$ is removed from S if $S_{sj}$ is older than some time t. This ensures that summary frames displayed on the screen are not too old to be relevant. At block 34, the next frame $f_k$ is scanned selected as the next keyframe $K_n$ if the intensity value is greater than the previously selected keyframe by some predefined threshold: i.e., $d(f_k, K_{n-1})>\delta$, at decision block 36. Here, d(,) measures the differences in the intensity or other properties of the intensity related measurement between two frames. Examples include histogram and pixel differences, described in Yeo and Liu, "Rapid Scene Analysis from Compressed Video", IEEE Transactions on Circuits and Systems for Video Technology, Vol. 5, No. 6, pp. 533-544, December 1995, herein incorporated by reference.

At block 38, after a keyframe $K_n$ is identified, it is then decided if it should be added to the set of summary frame S. The decision is made at block 40 as follows: $K_n$ is compared using a difference function d(,) against each frame $f_i \in S$. The one that yields the smallest difference is denoted $f_m$. If $d(f_m, k_n)<\epsilon$, i.e., if the keyframe $K_n$ and $f_m$ is sufficiently similar, we replace $f_m$ in S by $K_n$ and reorder the frames in S by increasing order of frames at block 42. If, on the other hand, this relationship does not hold, and the set S is not full, $K_n$ is inserted into the set anyway, as depicted in block 41. This technique is repeated until the last frame in the video is scanned, at block 44. This technique maintains only those summary frames that are sufficiently different from each other. Similar frames such as different shots of the same talking heads will not be maintained as summary frames. Thus, during the presentation, more different and diverse images can be displayed. This selection scheme is a one-pass scheme.

An alternative embodiment is to replace the frames that have been in set S by the keyframe K. This method will maintain in the set of summary frames those frames that are similar to each other. Thus, in a sequence of alternating shots depicting a conversion between two persons, k few frames portraying each of the persons will be maintain as summary frames.

Yet another alternative method to embed summary frames is to make use of results from a shot detection algorithm. An example technique that performs shot detection on MPEG (Motion Picture Expert Group) compressed video is described in Yeo and Liu, supra. A summary frame is then selected to represent each shot. This selection scheme is a two-pass scheme.

Figure 13:
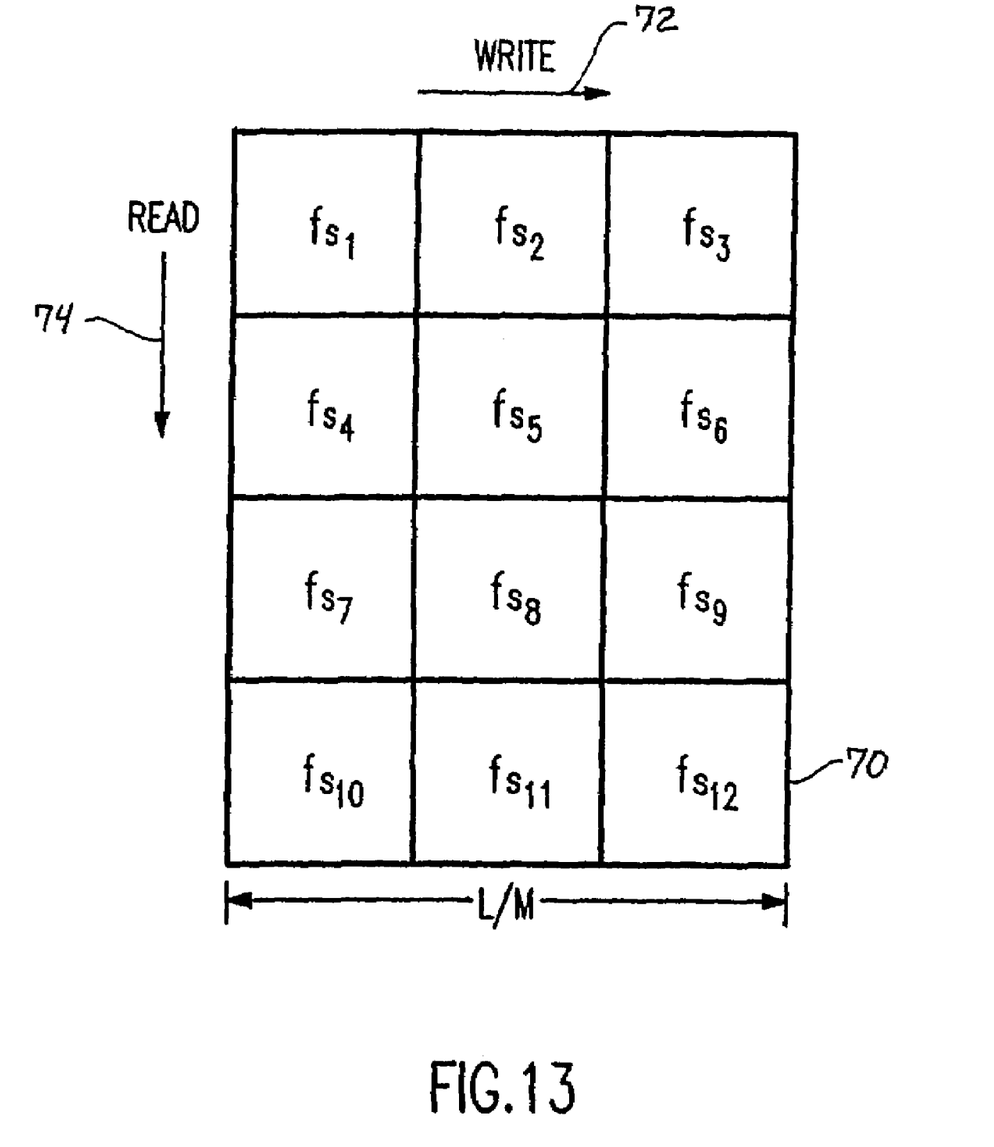
FIG. 13 is a table of interleaved summary frames.

It is desirable to not only allow the user to be able to see summary of video content about some time f prior to the current playback, but also to allow the user to see the summary of the video content about time 2t, 3t, prior to the current playback. Referring to FIG. 13, to achieve this, a preferred method of selecting summary frames from the set $S=\{f_{s1}, f_{s2}, f_{s3}, f_{sL}\}$ is to interleave the selection of frames. If at each step of embedding, it is desired to select and embed some M frames (assuming M divides L), the set of summary frames are listed or written into a table 70 of width L/M and height M in a row-wise fashion (i.e., place the frames in the first row first, from left to right, then in the second row, and so on), as shown by write arrow 72. In this example, L=12, and L/M=3. At each step of the embedding, the frames are read off in a next column, as illustrated by read arrow 74. In this manner, we guarantee that each set of M summary frames selected represent video content spanning a longer period of time than merely the most recent M summary. An alternative embodiment is to also embed the summary of video of the future, i.e. about some time t, 2t, 3t, . . . after the current playback.

Figure 14:
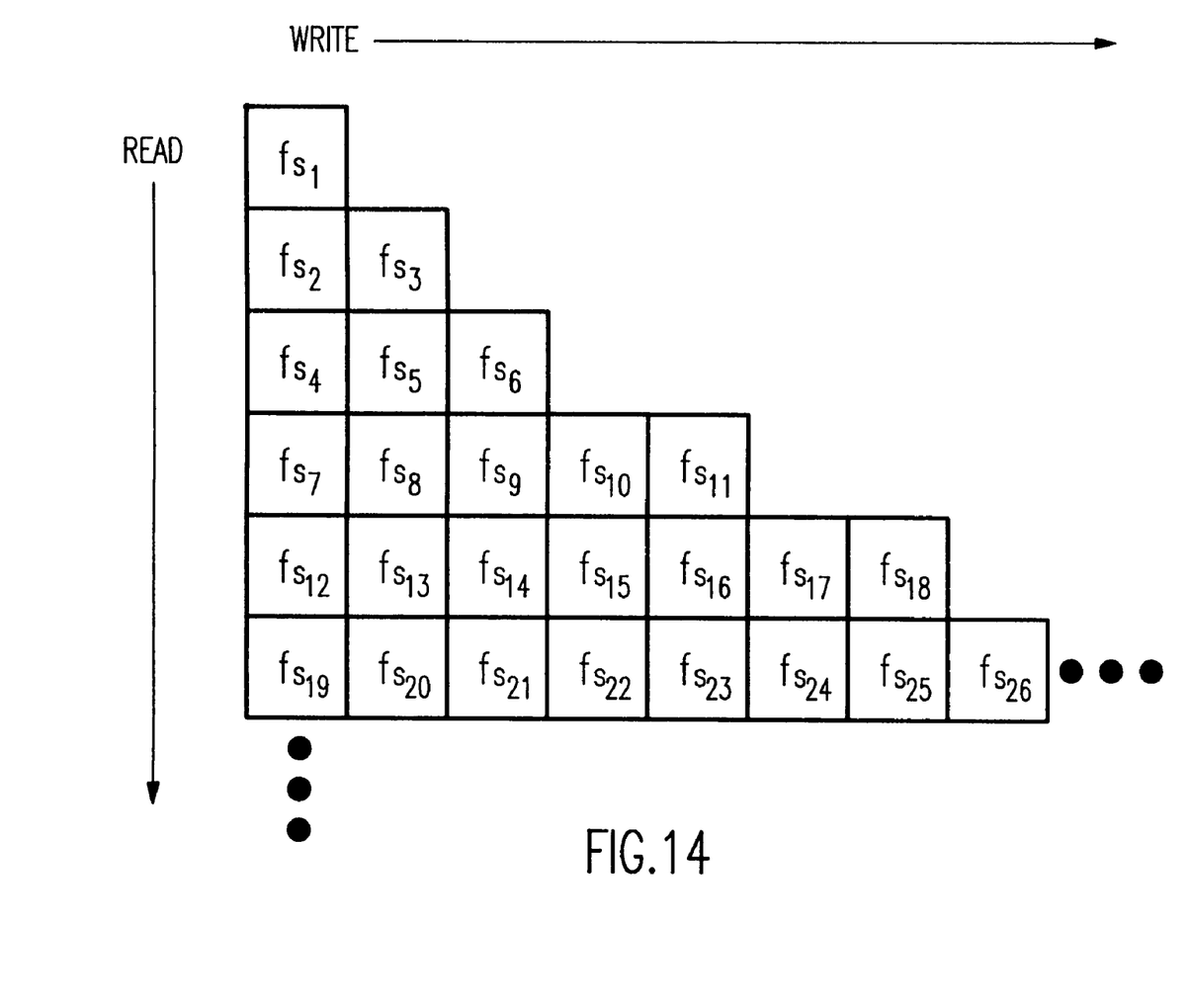
FIG. 14 is a table of second method for interleaving the selection of summary frames.

Another method of interleaving the selection of summary frames is shown in FIG. 14. Here, the Summary frames are listed row-wise in a triangular structure, i.e., each row has more columns than the previous one. At each step of the embedding, the frames are read off in a column fashion. For example, if each embedding step requires 4 frames, then fs1, fs2, fs4 and fs7 are first used. At the next step, fs12, fs19, fs3 and fs5 are used. This provides a non-uniform sampling in the sense that more summary frames are used that are closer to the current frame, and fewer frames are used that are further from the current frame. This achieves what is presented in FIG. 6B.

In an interactive video playback environment, such as the desktop or video streaming, the summary frames displayed with the playback frames can be further used for hyperlinking purposes, i.e., a user could click (or select) frames $f_{si}$ and the playback will continue from frame $f_{si}$.

A preferred use of summary-hyperlinking is now described. At the playback of some current shot $s_i$, the summary frames of the past shots and future 1 shots are simultaneously shown. The user can then easily see and replay one of the recent 1 shots or skip to one of the next shots; this is in contrast to the current method of video playback, in which a user can only see the current frame being playback.

Another preferred use of summary-hyperlinking is to embed the summary frames not of the current video being played back, but to embed the summary of video of another program. A user can then click (or choose) to jump to that particular. An example use would be showing the summary of another football game while the video playback is of another. A user can then watch the current game but also grasp the summary of the other game. He can also switch to the other game directly without the needing to know the channel.

For digital video compressed with standards such as MPEG-1 and MPEG-2, a preferred method to embed the summary frames is at the user-data area, which are specified by a particular header. To further ensure that the summary frames from the bitstreams can be extracted and displayed from any point (i.e., not necessarily from the very beginning) in the bitstreams, a new set of summary frame is embedded at fixed intervals T. For an MPEG-1 video (352 by 240 pixels) at 1.5 Mbits/see, a DC image takes up 1.8 Kbytes. If in one sec, 4 DC images are embedded, then the overhead is 7.2/192 or 3.75%. If instead, 1 DC image is embedded in each second, the overhead is 0.09375%. For an MPEG-2 video (704 by 480 pixels) at 4.0 Mbits/sec, a DC image takes up 7.92 Kbytes. The overhead for embedding 4 DC images/sec is 6.1% and for 1 DC image/sec is 1.5%. For higher bit rate MPEG-2 such as 6.0 M bits/sec, the respective overhead becomes 4% and 0.38%. The embedding process operates directly on the compressed video and does not require any decompression, and thus very computationally efficient.

While the invention has been described in terms of preferred embodiments, those skilled in the art will recognize that the invention can be practiced with modification within the spirit and scope of the appended claims.

We claim:

1. A video viewing system, comprising:
   means for selecting a programming channel containing video program in progress;
   a display screen for viewing a video program in progress; and
   at least one summary frame also displayed on said display screen overlaid onto said video program in progress at a same time when said programming channel is changed, said at least one summary frame comprising a past frame from said video program in progress,
   wherein the at least one summary frame comprises a plurality of said summary frames each corresponding to said video program in progress; and
   further comprising at least one preview frame comprising a future frame from said video program in progress relative to a real-time broadcast of the video program in progress, the at least one preview frame overlaid onto the video program in progress such that the at least one preview frame is simultaneously displayed with the at least one summary frame and the video program in progress.

2. A video viewing system as recited in claim 1 wherein said at least one summary frame displays a video segment on said viewing screen corresponding to said summary frame.

3. A video viewing system as recited in claim 1 comprising a plurality of said summary frames each correspond to a past frame from said video program in progress.

4. The video viewing system of claim 1, wherein the plurality of summary frames are displayed at the same time with said video program in progress.

5. A user interactive video viewing system, comprising:
   a display screen for viewing a video program in progress;
   at least one summary frame displayed on said display screen at a same time and overlaid with said video program in progress when a programming channel is changed, said at least one summary frame comprising a past frame from said video program in progress; and
   a control means for allowing a user to change the programming channel to change said video program in progress and for allowing said user to select said at least one summary frame to play at least a segment of said video program in progress corresponding to said selected summary frame,
   wherein the at least one summary frame comprises a plurality of said summary frames each corresponding to said video program in progress, and
   wherein said summary frames remain on said display screen when said video program is preempted, and
   further comprising at least one preview frame comprising a future frame from said video program in progress relative to a real-time broadcast of the video program in progress, the at least one preview frame overlaid onto the video program in progress such that the at least one preview frame is simultaneously displayed with the at least one summary frame and the video program in progress.

6. A user interactive video viewing system as recited in claim 5 wherein said viewing system comprises a television system.

7. A user interactive video viewing system as recited in claim 6 wherein the user can delete said summary frames from said display screen.

8. A user interactive video viewing system as recited in claim 5 wherein said viewing system comprises client connected to a server.

9. The user interactive video viewing system of claim 5, wherein the plurality of summary frames are displayed on said display screen at a same time with said video program in progress.

10. A method for informing a viewer of the content of a video program in progress, comprising the steps of:

selecting a plurality of summary frames depicting selected events from said video program in progress prior to a broadcast transmission of the video program in progress;

embedding said summary frames in said video program in progress;

transmitting said video program in progress embedded with said summary frames over a media; and displaying said video program in progress in a background and said summary frames in a foreground on a screen of a display device at a same time with said video program in progress when a viewer changes a channel to display said video program in progress in the background from a video program on another channel in the background, further comprising displaying at least one preview frame comprising a future frame from said video program in progress relative to a real-time broadcast of the video program in progress, the at least one preview frame overlaid onto the video program in progress such that the at least one preview frame is simultaneously displayed with the at least one summary frame and the video program in progress.

11. A method for informing a viewer of the content of a video program in progress as recited in claim 10, further comprising the steps:

displaying a video segment corresponding to a particular summary frame when said summary frame is selected by a viewer; and resuming said video program in progress when said video segment has finished.

12. A method for informing a viewer of the content of a video program in progress as recited in claim 10, comprising the step of continuing to display said summary frames when said video program in progress is preempted.

13. A method for informing a viewer of the content of a video program in progress as recited in claim 10 wherein said step of displaying said video program in progress comprising said summary frames on a screen comprises placing said video program in progress and said summary frames in designated windows on said screen.

14. A method for informing a viewer of the content of a video program in progress, comprising the steps of:

selecting a plurality of summary frames depicting selected events from said video program prior to a broadcast transmission of the video program;

embedding said summary frames in said video program;

transmitting said video program embedded with said summary frames over a media;

simultaneously displaying said video program in progress in a background and said summary frames in a foreground on a screen of a display device at a same time when a viewer changes a channel to display said video program in progress in the background;

further comprising displaying at least one preview frame comprising a future frame from said video program in progress relative to a real-time broadcast of the video program in progress, the at least one preview frame overlaid onto the video program in progress such that the at least one preview frame is simultaneously displayed with the at least one summary frame and the video program in progress.

15. A method for informing a viewer of the content of a video program in progress of claim 14, wherein the selecting of the plurality of summary frames to be embedded further comprises:

selecting from a set comprising L candidate summary frames of the video program, a subset of M summary frames, wherein M divides L, writing the L candidate summary frames in a table comprising a width of L/M and a height of M in a chronologic order in a row only direction; and selecting the plurality of summary frames to be embedded by reading M frames from the table in a column only direction to interleave the candidate summary frames.

16. A video viewing system, comprising:

means for selecting a programming channel containing a video program in progress;

a display screen for viewing said video program in progress; and at least one summary frame also displayed on said display screen along with said video program in progress at a same time when said programming channel is changed, said at least one summary frame comprising a past frame from said video program in progress, said at least one summary frame corresponding to a past frame from said video program in progress; and at least one preview frame comprising a future frame from said video program in progress relative to a real-time broadcast of the video program in progress displayed at a same time as said at least one summary frame and said video program in progress, wherein said at least one summary frame displays a video segment on said viewing screen corresponding to said at least one summary frame.

* * * * *